United States Patent
Hou

(10) Patent No.: US 11,797,334 B1
(45) Date of Patent: Oct. 24, 2023

(54) BMC PARAMETER CONFIGURATION AND EFFECT-TAKING METHOD AND APPARATUS, DEVICE, AND MEDIUM

(71) Applicant: INSPUR SUZHOU INTELLIGENT TECHNOLOGY CO., LTD., Jiangsu (CN)

(72) Inventor: Zhili Hou, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/039,232

(22) PCT Filed: Nov. 30, 2021

(86) PCT No.: PCT/CN2021/134432
§ 371 (c)(1),
(2) Date: May 27, 2023

(87) PCT Pub. No.: WO2022/267348
PCT Pub. Date: Dec. 29, 2022

(30) Foreign Application Priority Data

Jun. 22, 2021 (CN) .......................... 202110691443.X

(51) Int. Cl.
*G06F 9/48* (2006.01)
*G06F 8/71* (2018.01)
*G06F 9/54* (2006.01)

(52) U.S. Cl.
CPC .............. *G06F 9/4812* (2013.01); *G06F 8/71* (2013.01); *G06F 9/54* (2013.01)

(58) Field of Classification Search
CPC ............. G06F 9/4812; G06F 8/71; G06F 9/54
(Continued)

(56) References Cited

U.S. PATENT DOCUMENTS 4,942,540 A * 7/1990 Black .................. G06F 3/04817
709/228
5,930,465 A * 7/1999 Bellucco ............... G06F 3/1288
358/1.15
(Continued)

FOREIGN PATENT DOCUMENTS

CN 105721206 A 6/2016
CN 111181787 A 5/2020
(Continued)

*Primary Examiner* — Paul R. Myers
(74) *Attorney, Agent, or Firm* — IPRO, PLLC

(57) ABSTRACT

A method and apparatus for BMC-parameter configuring and taking-effect, a device and a medium. The method includes: after a first process receives a first external parameter, modifying a parameter-configuring state corresponding to the first external parameter of a database to be being-configured, and writing the first external parameter into the database, and triggering an interruption serving program at the same time; by using the interruption serving program, determining whether in the database there exists a parameter-configuring state that is being-configured; when in the database there exists the parameter-configuring state that is the being-configured, writing the first external parameter stored in the database into a configuration file; and after the first external parameter is successfully written into the configuration file, acquiring, from the database, a parameter taking-effect state corresponding to the first external parameter, and according to the parameter taking-effect state, performing taking-effect processing.

20 Claims, 2 Drawing Sheets

(58) Field of Classification Search
USPC .......................................................... 710/260
See application file for complete search history.

(56) References Cited

U.S. PATENT DOCUMENTS

| | | | | |
|---|---|---|---|---|
| 5,974,413 | A * | 10/1999 | Beauregard | G06F 9/45512 |
| 6,138,152 | A * | 10/2000 | Jalote | G06F 16/9566 |
| | | | | 707/999.203 |
| 6,263,212 | B1 * | 7/2001 | Ross | H04W 4/14 |
| | | | | 370/428 |
| 6,308,887 | B1 * | 10/2001 | Korman | H04L 9/40 |
| | | | | 902/4 |
| 8,035,403 | B1 * | 10/2011 | Campbell | G01N 33/24 |
| | | | | 324/694 |
| 2002/0069272 | A1 * | 6/2002 | Kim | H04L 61/00 |
| | | | | 709/221 |
| 2002/0198967 | A1 * | 12/2002 | Iwanojko | H04L 41/0873 |
| | | | | 709/220 |
| 2003/0076349 | A1 * | 4/2003 | Slaby | H04L 41/0883 |
| | | | | 715/735 |
| 2003/0191750 | A1 * | 10/2003 | Espino | G06F 16/9577 |
| 2005/0138467 | A1 * | 6/2005 | Theriault | G06F 16/10 |
| | | | | 711/114 |
| 2005/0216608 | A1 * | 9/2005 | Wang | G06F 13/28 |
| | | | | 710/22 |
| 2006/0184349 | A1 * | 8/2006 | Goud | G06F 9/45537 |
| | | | | 703/24 |
| 2006/0271647 | A1 * | 11/2006 | Tindall | H04L 41/0843 |
| | | | | 709/220 |
| 2014/0250292 | A1 * | 9/2014 | Edwards | G06F 9/44 |
| | | | | 713/1 |
| 2017/0357535 | A1 * | 12/2017 | Brassard | G06F 16/23 |
| 2019/0034636 | A1 | 1/2019 | Gopinath et al. | |
| 2021/0382726 | A1 * | 12/2021 | Zhou | G06F 9/451 |

FOREIGN PATENT DOCUMENTS

| | | |
|---|---|---|
| CN | 112434045 A | 3/2021 |
| CN | 113254062 A | 8/2021 |

\* cited by examiner

BMC PARAMETER CONFIGURATION AND EFFECT-TAKING METHOD AND APPARATUS, DEVICE, AND MEDIUM

The present application claims the priority of the Chinese patent application filed on Jun. 22, 2021 before the Chinese Patent Office with the application number of 202110691443.X and the title of "BMC PARAMETER CONFIGURATION AND EFFECT-TAKING METHOD AND APPARATUS, DEVICE, AND MEDIUM", which is incorporated herein in its entirety by reference.

FIELD

The present application relates to the technical field of parameter configuring and taking-effect, and particularly relates to a method and apparatus for BMC-parameter configuring and taking-effect, an electronic device and a computer-readable storage medium.

BACKGROUND

BMC (Board Management Controller) is a managing subsystem that is independent of the OS (Operating System). The BMC contains various types of parameters, such as the user parameter, the sel/sol parameter and so on defined in the IPMI (Intelligent Platform Management Interface) specification, and network parameters such as the IP address (Internet Protocol Address), the subnet mask and the gateway, which may be configured by the user by using a provided user interaction interface. In the current methods for the BMC to configure the parameters and enable the parameters to take effect, processes communicate therebetween by means of pipelines and so on, and the configured parameters are transmitted between the processes also by means of pipelines. In the different processes, different threads are created to process the parameters or data received from the pipelines. After a particular parameter has been received, the configuration file of the corresponding process is updated, and the relevant service is restarted, whereby the parameter may immediately take effect. However, all of the different processes are required to create a corresponding thread to receive and configure the configuration parameters relevant to this process, which increases the quantity of the threads of the Linux system, increases a certain overhead of the thread dispatching of the Linux system, and increases the consumption of the system resource to a certain extent. The parameter transmission by means of pipelines has a low efficiency. The multithreading parameter processing increases the system overhead, and deteriorates the system performance.

Therefore, how to provide a solution that solves the above-described technical problems is a problem that currently a person skilled in the art requires to solve.

SUMMARY

A purpose of the present application is to provide a method and apparatus for BMC-parameter configuring and taking-effect, an electronic device and a computer-readable storage medium, which may reduce the consumption of the system, and increase the efficiency of the parameter transmission. The particular solutions are as follows:

the present application provides a method for BMC-parameter configuring and taking-effect, and the method includes:

after a first process receives a first external parameter, modifying a parameter-configuring state corresponding to the first external parameter of a database to be being-configured, and writing the first external parameter into the database, and triggering an interruption serving program at the same time;

by using the interruption serving program, determining whether in the database there exists a parameter-configuring state that is being-configured;

when in the database there exists the parameter-configuring state that is the being-configured, writing the first external parameter stored in the database into a configuration file; and after the first external parameter is successfully written into the configuration file, acquiring, from the database, a parameter taking-effect state corresponding to the first external parameter, and according to the parameter taking-effect state, performing taking-effect processing.

In some embodiments of the present application, the operation of, after the first process receives the first external parameter, writing the first external parameter into the database, and triggering the interruption serving program at the same time includes:

after the first process receives the first external parameter by using a first GPIO, writing the first external parameter into the database, and triggering the interruption serving program by using a second GPIO short-circuited to the first GPIO at the same time.

In some embodiments of the present application, the method further includes:

after a second process receives a second external parameter, determining whether in the database there exists a parameter-configuring state that is the being-configured; and when no parameter-configuring state is the being-configured, modifying a parameter-configuring state corresponding to the second external parameter of the database to be the being-configured, to realize configuring and taking-effect of the second external parameter.

In some embodiments of the present application, the method further includes:

recording a configuring duration of the configuring of the first external parameter; and when the configuring duration exceeds a preset duration, determining that the configuring is overtime.

In some embodiments of the present application, after the operation of writing the first external parameter into the database, the method further includes:

after the first external parameter is successfully written into the configuration file, updating the parameter-configuring state corresponding to the first external parameter in the database to configuration success; and when the first external parameter is not successfully written into the configuration file, according to an error type of a writing error in a writing process, updating the parameter-configuring state, and the parameter-configuring state corresponding to the error type includes one or more of being-idle, configuration file does not exist, configuration parameter does not exist, parameter configuration error and another error.

In some embodiments of the present application, the method further includes:

feeding back the parameter-configuring state obtained after the parameter configuring to a user side.

In some embodiments of the present application, the database is a redis database.

In some embodiments of the present application, the operation of, according to the parameter taking-effect state, performing the taking-effect processing includes:

according to the parameter taking-effect state, determining a corresponding taking-effect condition; and according to the taking-effect condition, performing the taking-effect processing; and the taking-effect condition includes one or more of taking effect immediately, taking effect when a BMC restarts automatically, taking effect when a BMC restarts next time, and taking effect delayed.

The present application provides an apparatus for BMC-parameter configuring and taking-effect, and the apparatus includes:

a parameter writing and interruption triggering module configured for, after a first process receives a first external parameter, modifying a parameter-configuring state corresponding to the first external parameter of a database to be being-configured, and writing the first external parameter into the database, and triggering an interruption serving program at the same time;

a state determining module configured for, by using the interruption serving program, determining whether in the database there exists a parameter-configuring state that is being-configured;

a configuring module configured for, when in the database there exists the parameter-configuring state that is the being-configured, writing the first external parameter stored in the database into a configuration file; and a taking-effect module configured for, after the first external parameter is successfully written into the configuration file, acquiring, from the database, a parameter taking-effect state corresponding to the first external parameter, and according to the parameter taking-effect state, performing taking-effect processing.

The present application provides an electronic device, and the electronic device includes:

a memory configured for storing a computer program; and a processor configured for, when executing the computer program, implementing the operations of the method for BMC-parameter configuring and taking-effect stated above.

The present application provides a computer-readable storage medium, and the computer-readable storage medium stores a computer program, and the computer program, when executed by a processor, implements the operations of the method for BMC-parameter configuring and taking-effect stated above.

The present application provides a method for BMC-parameter configuring and taking-effect, and the method includes: after a first process receives a first external parameter, modifying a parameter-configuring state corresponding to the first external parameter of a database to be being-configured, and writing the first external parameter into the database, and triggering an interruption serving program at the same time; by using the interruption serving program, determining whether in the database there exists a parameter-configuring state that is being-configured; when in the database there exists the parameter-configuring state that is the being-configured, writing the first external parameter stored in the database into a configuration file; and after the first external parameter is successfully written into the configuration file, acquiring, from the database, a parameter taking-effect state corresponding to the first external parameter, and according to the parameter taking-effect state, performing taking-effect processing.

It can be seen that, in the present application, the parameter-configuring states and the parameter taking-effect states are introduced into the database to configure the parameters and cause the parameters to take effect. While the first external parameter is written into the database, the interruption serving program is triggered, and the interruption serving program is used to, by using the parameter-configuring states, determine which parameters change and require to be processed, to more concentrate the configuring of the external parameters, which may be realized by merely using the interruption serving program, thereby improving the expansibility. When in the database there is a parameter-configuring state that is being-configured, the first external parameter stored in the database is written into the configuration file, and, according to the corresponding parameter taking-effect state, the parameter is caused to take effect. By setting the parameter taking-effect states, the taking-effect mechanism is flexibly realized, to satisfy the different demands of the users. The present application, by using the database as the medium of the interprocess communication, and using the parameter-configuring states and the parameter taking-effect states of the database, realizes the configuring and the taking-effect of the parameters. The communication mode that does not require the pipelines does not only increase the efficiency of the parameter transmission, but also reduces the load of the system.

The present application further provides an apparatus for BMC-parameter configuring and taking-effect, an electronic device and a computer-readable storage medium, all of which have the above-described advantageous effects, which is not discussed further herein.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art may obtain other figures according to the provided figures without paying creative work.

DETAILED DESCRIPTION

Figure 1:
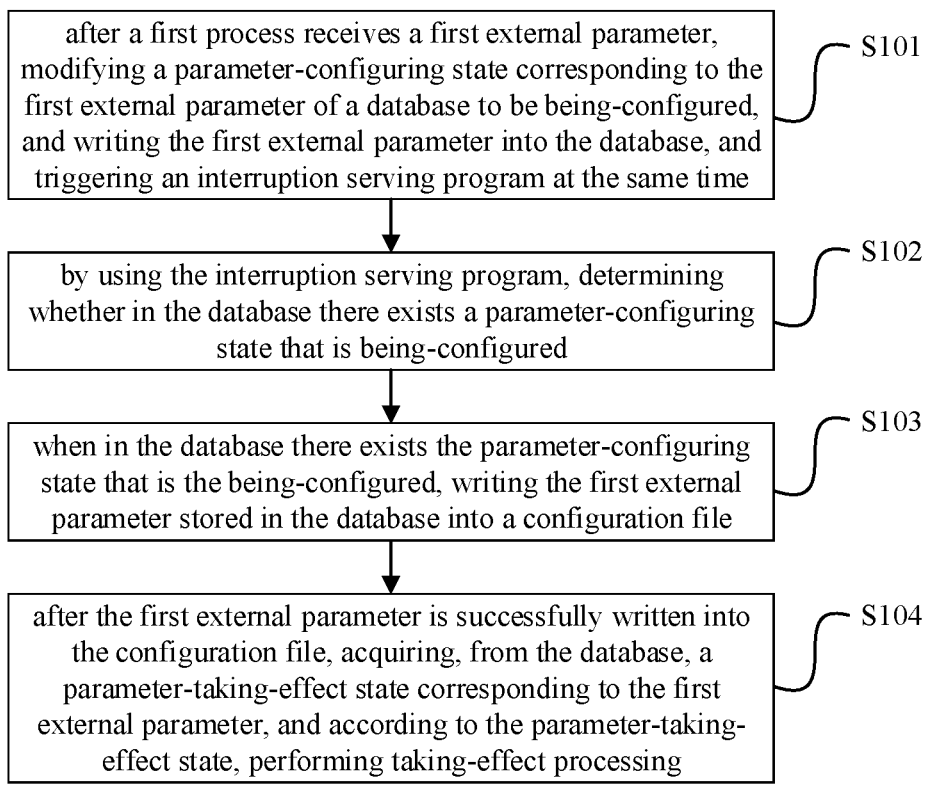
FIG. 1 is a flow chart of a method for BMC-parameter configuring and taking-effect according to an embodiment of the present application.

In order to make the objects, the technical solutions and the advantages of the embodiments of the present application clearer, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the current methods for the BMC to configure the parameters and enable the parameters to take effect, processes communicate therebetween by means of pipelines and so on, and the configured parameters are transmitted between the processes also by means of pipelines. In the different processes, different threads are created to process the parameters or data received from the pipelines. After a particular parameter is received, the configuration file of the corresponding process is updated, and the relevant service is restarted, whereby the parameter may immediately take effect. However, all of the different processes are required to create a corresponding thread to receive and configure the configuration parameters relevant to this process, which increases the quantity of the threads of the Linux system, increases a certain overhead of the thread dispatching of the Linux system, and increases the consumption of the system resource to a certain extent. The parameter transmission by means of pipelines has a low efficiency. The multithreading parameter processing increases the system overhead, and deteriorates the system performance.

In view of the above technical problems, the present embodiment provides a method for BMC-parameter configuring and taking-effect. The parameter-configuring states and the parameter taking-effect states are introduced into the database to configure the parameters and cause the parameters to take effect. While the first external parameter is written into the database, the interruption serving program is triggered, and the interruption serving program is used to, by using the parameter-configuring states, determine which parameters changes and require to be processed, to more concentrate the configuring of the external parameters, which may be realized by merely using the interruption serving program, thereby improving the expansibility. When in the database there is a parameter-configuring state that is being-configured, the first external parameter stored in the database is written into the configuration file, and, according to the corresponding parameter taking-effect state, the parameter is caused to take effect. By setting the parameter taking-effect states, the taking-effect mechanism is flexibly realized, to satisfy the different demands of the users. The present application, by using the database as the medium of the interprocess communication, and using the parameter-configuring states and the parameter taking-effect states of the database, realizes the configuring and the taking-effect of the parameters. The communication mode that does not require the pipelines does not only increase the efficiency of the parameter transmission, but also reduces the load of the system.

Referring to FIG. 1, FIG. 1 is a flow chart of a method for BMC-parameter configuring and taking-effect according to an embodiment of the present application. The method particularly includes:

S101: after a first process receives a first external parameter, modifying a parameter-configuring state corresponding to the first external parameter of a database to be being-configured, and writing the first external parameter into the database, and triggering an interruption serving program at the same time.

In the present embodiment, the database is introduced into the BMC as the main approach of the interprocess communication. The database includes the parameter-configuring states and the parameter taking-effect states. The processes, in use, may directly use the corresponding parameter-configuring states and parameter taking-effect states in the database, which has a higher timeliness, and solves the problem of the communication between the different processes.

In the present embodiment, the database stores parameter-configuring states corresponding to a plurality of types of parameters. After the first process receives the first external parameter, it firstly modifies the corresponding parameter-configuring state in the database to be being-configured, and subsequently writes the first external parameter into the database, in some embodiments, into a predetermined position of the database. Meanwhile, the interruption serving program is triggered, and the interruption serving program is used to, by using the parameter-configuring states, determine which parameters changes and require to be processed, to more concentrate the configuring of the external parameters, which may be realized by merely using the interruption serving program, thereby improving the expansibility.

In some embodiments of the present application, the method further includes:

providing a key-value pair of one parameter-configuring state in the database. The key name may be configured according to demands, and, for example, may be configured to be paramcfgstatus. The state key describes a key-value pair of a type of an array, and each of the elements in the array represents the configuring state of a certain type of parameters. The configuring state includes being-idle (with the value of 0), being-configured (with the value of 1), configuration file does not exist (with the value of 2), configuration parameter does not exist (with the value of 3), parameter configuration error (with the value of 4), another error (with the value of 5) and parameter configuration success (with the value of 6). The particular values may also be set according to demands, which is not limited in the present embodiment, as long as the purpose of the present embodiment may be realized.

S102: by using the interruption serving program, determining whether in the database there exists a parameter-configuring state that is being-configured.

By using the interruption serving program, it is determined whether in the database there exists the parameter-configuring state that is being-configured. When in the database there exists the parameter-configuring state that is the being-configured, then the step S103 is executed. When in the database there is no parameter-configuring state that is the being-configured, then it is determined that there is no parameter that requires configuring and taking-effect.

S103: when in the database there exists the parameter-configuring state that is the being-configured, writing the first external parameter stored in the database into a configuration file.

S104: after the first external parameter is successfully written into the configuration file, acquiring, from the database, a parameter taking-effect state corresponding to the first external parameter, and according to the parameter taking-effect state, performing taking-effect processing.

The database is provided with parameter taking-effect states, to represent the conditions required for the taking-effect of each of the types of parameters. After the first external parameter is successfully written into the configuration file, the parameter taking-effect state corresponding to the first external parameter is acquired, and subsequently the taking-effect processing is performed.

In some embodiments of the present application, the method further includes:

providing a key-value pair of one parameter taking-effect state in the database. The key name may be configured according to demands, and, for example, may be configured to be paramtakeeffectstatus. The state key describes a key-value pair of the type of the array, and each of the elements in the array represents the taking-effect condition of a certain type of parameters. The taking-effect condition includes taking effect immediately (with the value of 0), taking effect when a BMC restarts automatically (with the value of 0xff), taking effect when a BMC restarts next time (with the value of 0xFe), and taking effect delayed (represented by other numerical values), among them, the corresponding numerical values represent the duration of the delaying with the unit of seconds. The particular values may also be set according to demands, which is not limited in the present embodiment, as long as the purpose of the present embodiment may be realized.

On the basis of the above technical solution, in the present embodiment, the parameter-configuring states and the parameter taking-effect states are introduced into the database to configure the parameters and cause the parameters to take effect. While the first external parameter is written into the database, the interruption serving program is triggered, and the interruption serving program is used to, by using the parameter-configuring states, determine which parameters changes and require to be processed, to more concentrate the configuring of the external parameters, which may be realized by merely using the interruption serving program, thereby improving the expansibility. When in the database there is the parameter-configuring state that is the being-configured, the first external parameter stored in the database is written into the configuration file, and, according to the corresponding parameter taking-effect state, the parameter is caused to take effect. By setting the parameter taking-effect states, the taking-effect mechanism is flexibly realized, to satisfy the different demands of the users. The present application, by using the database as the medium of the interprocess communication, and using the parameter-configuring states and the parameter taking-effect states of the database, realizes the configuring and the taking-effect of the parameters. The communication mode that does not require the pipelines does not only increase the efficiency of the parameter transmission, but also reduces the load of the system.

On the basis of the above embodiment, in order to efficiently realize the function of triggering, the operation of, after the first process receives the first external parameter, writing the first external parameter into the database, and triggering the interruption serving program at the same time includes:

after the first process receives the first external parameter by using a first GPIO (General-Purpose Input/Output), writing the first external parameter into the database, and triggering the interruption serving program by using a second GPIO short-circuited to the first GPIO at the same time.

In the present embodiment, two ordinary GPIOs are selected in the BMC. The first GPIO and the second GPIO are externally connected, among them, the first GPIO serves as the triggering source, the second GPIO is registered as system interruption, and the interruption triggering condition is the rising edge. It may be understood that the IFC process of the first GPIO serves as the triggering source, and all of the generally provided user interfaces, such as IPMI, the REST (Representational State Transfer) interface, the redfis interface and the SNMP (Simple Network Management Protocol) interface are implemented by using different processes, which, in order to facilitate the description, are temporarily marked as the IFC process.

On the basis of the above technical solution, the mode of realizing the parameter configuring by using the GPIOs leads of the physical hardware and the interruption mechanism according to the present embodiment reduces the load of the Linux system to a large extent, and does not require the communication modes that require real-time monitoring or congestion such as pipelines.

On the basis of any one of the above embodiments, in order to ensure the accuracy of the parameter configuring and taking-effect of each of the processes, the method for BMC-parameter configuring and taking-effect further includes:

after a second process receives a second external parameter, determining whether in the database there exists a parameter-configuring state that is the being-configured; and when no parameter-configuring state is the being-configured, modifying a parameter-configuring state corresponding to the second external parameter of the database to be the being-configured, to realize configuring and taking-effect of the second external parameter.

After the second process receives the second external parameter, firstly, it is determined whether in the database there exists the parameter-configuring state that is the being-configured. In some embodiments, when in the database there exists the parameter-configuring state that is the being-configured, then it is determined that the previous one process, i.e., the first process, is not completely processed. Merely when all of the processes are completely processed, and no parameter-configuring state is the being-configured, the parameter-configuring state corresponding to the second external parameter of the database is modified to be the being-configured, to realize the configuring and taking-effect of the second external parameter.

It can be seen that, in the present embodiment, after the external parameter is received, and before the parameter-configuring state is modified into the being-configured, firstly it is determined whether in the database there is the parameter-configuring state that is the being-configured, and only when there is no parameter-configuring state that is the being-configured, the modification is performed, which ensures the accuracy and the reliability of the configuring and taking-effect of each of the parameters, to prevent erroneous configuring.

On the basis of any one of the above embodiments, the method further includes:

recording a configuring duration of the configuring of the first external parameter; and when the configuring duration exceeds a preset duration, determining that the configuring is overtime.

The parameter configuring duration is recorded, and when the preset duration is exceeded, it is determined that the configuring is overtime. In the configuring, configuring error might happen. Accordingly, the configuring of the next external parameter may be processed, and after a predetermined condition is reached, the first external parameter is reconfigured, to increase the efficiency of the configuring of the external parameter. The predetermined condition may be that no external parameter requires to be configured, or that, after the system restarts, the configuring of the first external parameter is performed again, which is not limited in the present embodiment, and may be set according to practical demands by the user. Certainly, the log information of the configuring overtime may be sent to the user, so that the user may track and solve in time.

On the basis of any one of the above embodiments, after the operation of writing the first external parameter into the database, the method further includes:

after the first external parameter is successfully written into the configuration file, updating the parameter-configuring state corresponding to the first external parameter in the database to configuration success; and when the first external parameter is not successfully written into the configuration file, according to an error type of a writing error in a writing process, updating the parameter-configuring state, and the parameter-configuring state corresponding to the error type includes one or more of being-idle, configuration file does not exist, configuration parameter does not exist, parameter configuration error and another error.

On the basis of the above technical solution, in the present embodiment, after the first external parameter is successfully written into the configuration file, the corresponding parameter-configuring state is updated timely to configuration success. When the configuring process has an error, the parameter-configuring state is updated according to the type of the error.

On the basis of any one of the above embodiments, in order to ensure that the user may track the configuring process, and know the profile of the error timely, to facilitate the subsequent system maintenance, the method further includes:

feeding back the parameter-configuring state obtained after the parameter configuring to a user side.

In an embodiment, after a request sent by the user side is received, according to the request, the parameter-configuring state obtained after the parameter configuring is fed back to the user side. In another embodiment, after the quantity of the parameter configuring reaches a preset quantity, the parameter-configuring state obtained after the parameter configuring is fed back to the user side. In another embodiment, with a preset period, the parameter-configuring state obtained after the parameter configuring is fed back to the user side. Which of the above modes is particularly used is not limited in the present embodiment, and may be customized by the user.

On the basis of the above technical solution, the present embodiment, by feeding back the value of the parameter-configuring state to the user side, ensures that the user may track the configuring process, and know the profile of the error timely, to facilitate the subsequent system maintenance.

In some embodiments of the present application, the database is a redis database. The mutual-exclusion mechanism of the redis database is employed, and it is not required to handle the synchronization mechanism between the different processes by oneself, which results in a good reliability. In some embodiments, the method for BMC-parameter configuring and taking-effect is implemented based on the interruption function of the GPIOs and the redis database, the communication channels of the IFC process and the interruption-service processing function are realized by using the GPIOs, and, subsequently, by configuring the two fields in the redis database, the parameter-configuring states and the triggering mechanism of the parameter-configuring and taking-effect are customized and processed. That excellently solves the problem of mutual exclusion between the different processes, the problem of parameter configuring and taking-effect, the problems of the high resource consumption and the dispersive parameter-configuration distribution of the Linux system, and so on, facilitates problem troubleshooting, and may be applied to all of Linux embedded systems.

In some embodiments of the present application, the operation of, according to the parameter taking-effect state, performing the taking-effect processing includes: according to the parameter taking-effect state, determining a corresponding taking-effect condition; and according to the taking-effect condition, performing the taking-effect processing; and the taking-effect condition includes one or more of taking effect immediately, taking effect when a BMC restarts automatically, taking effect when a BMC restarts next time, and taking effect delayed. By introducing the parameter taking-effect state corresponding to the field of the taking-effect mechanism, the user may flexibly select the triggering condition for the parameter taking-effect, i.e., whether it is required to take effect immediately, or it is required to restart the BMC or delay for a certain duration and subsequently take effect, whereby the flexibility is better, and the customization by the user may be satisfied more easily.

On the basis of any one of the above embodiments, the present embodiment provides a method for BMC-parameter configuring and taking-effect based on the interruption function of the GPIOs and the redis database. The main implementing steps will be described as follows:

S1: firstly, introducing the redis database into the BMC as the main approach of the interprocess communication.

S2: providing a key-value pair of one parameter-configuring state in the redis database, wherein the key name is paramcfgstatus. The state key describes a key-value pair of the type of the array, and each of the elements in the array represents the configuring state of a certain type of parameters. The configuring state includes being-idle (with the value of 0), being-configured (with the value of 1), configuration file does not exist (with the value of 2), configuration parameter does not exist (with the value of 3), parameter configuration error (with the value of 4), another error (with the value of 5) and parameter configuration success (with the value of 6).

S3: providing a key-value pair of one parameter taking-effect state in the redis database, wherein the key name is paramtakeeffectstatus. The state key describes a key-value pair of the type of the array, and each of the elements in the array represents the taking-effect condition of a certain type of parameters. The taking-effect condition includes taking effect immediately (with the value of 0), taking effect when a BMC restarts automatically (with the value of 0xff), taking effect when a BMC restarts next time (with the value of 0xFe), and taking effect delayed (represented by other numerical values), among them, the corresponding numerical values represent the duration of the delaying with the unit of seconds.

S4: selecting two ordinary GPIOs in the BMC, and externally connecting the two GPIOs, wherein one of the GPIOs serves as the triggering source in the IFC process, the other GPIO is registered as system interruption, and the interruption triggering condition is the rising edge.

S5: implementing an interrupt processing function.

This operation includes, firstly, acquiring the value corresponding to the key of paramcfgstatus, and reading through each of the elements in the acquired paramcfgstatus array;

determining whether the state of each type of the parameters is the being-configured;

when the state of each type of the parameters is the being-configured, then acquiring the corresponding parameter configuration from the promised region of the redis database into the corresponding configuration file;

when an error appears in the process of the writing into the configuration file, then, according to the error type, writing the field corresponding to paramcfgstatus as configuration file does not exist, configuration parameter does not exist, parameter configuration error or another error;

when the configuring succeeds, then modifying the field corresponding to paramcfgstatus into parameter configuration success, acquiring paramtakeeffectstatus from the redis database, and looking up the taking-effect condition of the corresponding parameter in the array; when it is the taking effect immediately, then immediately restarting the process using the parameter; when it is the taking effect when a BMC restarts automatically, then immediately restarting the BMC; when it is the taking effect when a BMC restarts next time, then not performing any operation, and recording the log to prompt the background maintainer that there is a parameter configuration, and when it is required to take effect then it is required to manually restart the BMC by the background maintainer; and when it is the taking effect delayed, then delaying for the corresponding duration and subsequently restarting the process corresponding to the parameter; and after the parameter processing is completed, determining whether another parameter of paramcfgstatus requires processing; when another parameter of paramcfgstatus requires processing, then processing it; and when there is no parameter of paramcfgstatus required to be processed, then exiting.

S6: when the IFC process has a demand of parameter configuring, firstly writing the parameter into the corresponding configuration-parameter region of the redis database, subsequently setting the state of paramcfgstatus into the being-configured, and triggering the corresponding GPIO to initiate the interruption serving function in the step S5 to process; and after paramtakeeffectstatus is processed by using the different strategies of different parameters, subsequently detecting in real time the paramcfgstatus state therein, determining the processing process and the result of the interruption serving function according to the state, and returning the result of the parameter configuring to the user.

On the basis of the above technical solution, the present embodiment has the following advantageous effects. The mode of realizing the parameter configuring by using the GPIOs leads of the physical hardware and the interruption mechanism reduces the load of the Linux system to a large extent, and does not require the communication modes that require real-time monitoring or congestion such as pipelines. The parameter processing and the parameter configuring are more concentrated, and, when a problem emerges, the troubleshooting may be easily performed. By using the one interruption serving function, the configuring and taking-effect of the different parameters may be realized, and the interruption serving function may be processed by using the mechanisms of callback functions, with very excellent expansibility and flexibility. By using the corresponding fields in the redis database, the relevant errors and states during the parameter configuring may be timely fed back to the parameter configuring process, whereby the user may know whether the parameter configuring succeeds and the reason for the failure. By introducing the field of the taking-effect mechanism, the user may flexibly select the triggering condition for the parameter taking-effect, i.e., whether it is required to take effect immediately, or it is required to restart the BMC or delay for a certain duration and subsequently take effect, whereby the flexibility is better, and the customization by the user may be satisfied more easily.

Figure 2:
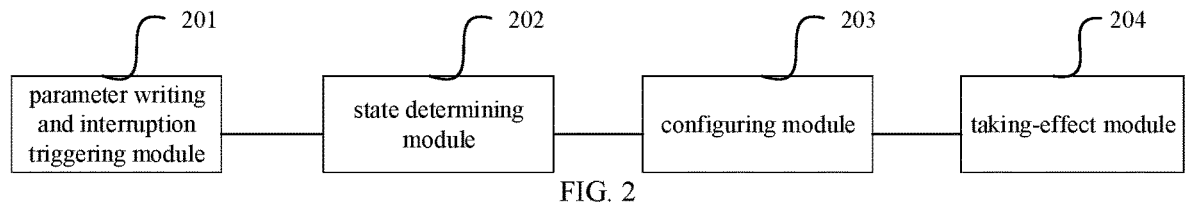
FIG. 2 is a schematic structural diagram of an apparatus for BMC-parameter configuring and taking-effect according to an embodiment of the present application.

An apparatus for BMC-parameter configuring and taking-effect according to the embodiments of the present application will be described below, and the apparatus for BMC-parameter configuring and taking-effect described below and the method for BMC-parameter configuring and taking-effect described above may correspondingly refer to each other. Referring to FIG. 2, FIG. 2 is a schematic structural diagram of an apparatus for BMC-parameter configuring and taking-effect according to an embodiment of the present application. The apparatus includes:

a parameter writing and interruption triggering module 201 configured for, after a first process receives a first external parameter, writing the first external parameter into the database, and triggering an interruption serving program at the same time;

a state determining module 202 configured for, by using the interruption serving program, determining whether in the database there exists a parameter-configuring state that is being-configured;

a configuring module 203 configured for, when in the database there exists the parameter-configuring state that is the being-configured, writing the first external parameter stored in the database into a configuration file; and a taking-effect module 204 configured for, after the first external parameter is successfully written into the configuration file, acquiring from the database a parameter taking-effect state corresponding to the first external parameter, and according to the parameter taking-effect state, performing taking-effect processing.

In some embodiments of the present application, the parameter writing and interruption triggering module 201 is particularly configured for:

after the first process receives the first external parameter by using a first GPIO, writing the first external parameter into the database, and triggering the interruption serving program by using a second GPIO short-circuited to the first GPIO at the same time.

In some embodiments of the present application, the apparatus further includes:

a judging module configured for, after a second process receives a second external parameter, determining whether in the database there exists a parameter-configuring state that is the being-configured; and a modifying module configured for, when no parameter-configuring state is the being-configured, modifying a parameter-configuring state corresponding to the second external parameter of the database to be the being-configured, to realize configuring and taking-effect of the second external parameter.

In some embodiments of the present application, the apparatus further includes:

a duration recording module configured for recording a configuring duration of the configuring of the first external parameter; and a determining module configured for, when the configuring duration exceeds a preset duration, determining that the configuring is overtime.

In some embodiments of the present application, the apparatus further includes: a state updating module configured for:

after the first external parameter is successfully written into the configuration file, updating the parameter-configuring state corresponding to the first external parameter in the database to configuration success; and when the first external parameter is not successfully written into the configuration file, according to an error type of a writing error in a writing process, updating the parameter-configuring state, and the parameter-configuring state corresponding to the error type includes one or more of being-idle, configuration file does not exist, configuration parameter does not exist, parameter configuration error and another error.

In some embodiments of the present application, the apparatus further includes:

a feeding-back module configured for feeding back the parameter-configuring state obtained after the parameter configuring to a user side.

In some embodiments of the present application, the database is a redis database.

In some embodiments of the present application, the taking-effect module 204 includes:

a taking-effect-condition determining unit configured for, according to the parameter taking-effect state, determining a corresponding taking-effect condition; and a taking-effect-processing unit configured for, according to the taking-effect condition, performing the taking-effect processing;

wherein the taking-effect condition includes one or more of taking effect immediately, taking effect when a BMC restarts automatically, taking effect when a BMC restarts next time, and taking effect delayed.

Because the embodiments of the apparatus and the embodiments of the method correspond to each other, the embodiments of the apparatus may refer to the description on the embodiments of the method, and are not discussed further herein.

An electronic device according to the embodiments of the present application will be described below, and the electronic device described below and the method described above may correspondingly refer to each other.

Figure 3:
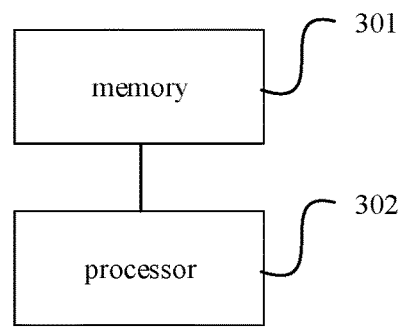
FIG. 3 is a schematic structural diagram of an electronic device according to an embodiment of the present application.

Referring to FIG. 3, FIG. 3 is a schematic structural diagram of an electronic device according to an embodiment of the present application. The electronic device includes:

a memory 301 configured for storing a computer program; and a processor 302 configured for, when executing the computer program, implementing the operations of the method for BMC-parameter configuring and taking-effect stated above.

The memory 301 includes a non-transitory storage medium and an internal memory. The non-transitory storage medium stores an operating system and a computer-readable instruction. The internal memory provides the environment for the running of the operating system and the computer-readable instruction in the non-transitory storage medium. The processor 302 provides the capacities of calculating and controlling to the electronic device, and, when executing the computer program stored in the memory 301, may implement the following operations: after a first process receives a first external parameter, modifying a parameter-configuring state corresponding to the first external parameter of a database to be being-configured, and writing the first external parameter into the database, and triggering an interruption serving program at the same time; by using the interruption serving program, determining whether in the database there exists a parameter-configuring state that is being-configured; when in the database there exists the parameter-configuring state that is the being-configured, writing the first external parameter stored in the database into a configuration file; and after the first external parameter is successfully written into the configuration file, acquiring from the database a parameter taking-effect state corresponding to the first external parameter, and according to the parameter taking-effect state, performing taking-effect processing.

In some embodiments, the processor 302, when executing a computer subprogram stored in the memory 301, may implement the following operations: after the first process receives the first external parameter by using a first GPIO, writing the first external parameter into the database, and triggering the interruption serving program by using a second GPIO short-circuited to the first GPIO at the same time.

In some embodiments, the processor 302, when executing a computer subprogram stored in the memory 301, may implement the following operations: after a second process receives a second external parameter, determining whether in the database there exists a parameter-configuring state that is the being-configured; and when no parameter-configuring state is the being-configured, modifying a parameter-configuring state corresponding to the second external parameter of the database to be the being-configured, to realize configuring and taking-effect of the second external parameter.

In some embodiments, the processor 302, when executing a computer subprogram stored in the memory 301, may implement the following operations: recording a configuring duration of the configuring of the first external parameter; and when the configuring duration exceeds a preset duration, determining that the configuring is overtime.

In some embodiments, the processor 302, when executing a computer subprogram stored in the memory 301, may implement the following operations: after the first external parameter is successfully written into the configuration file, updating the parameter-configuring state corresponding to the first external parameter in the database to configuration success; and when the first external parameter is not successfully written into the configuration file, according to an error type of a writing error in a writing process, updating the parameter-configuring state, and the parameter-configuring state corresponding to the error type includes one or more of being-idle, configuration file does not exist, configuration parameter does not exist, parameter configuration error and another error.

In some embodiments, the processor 302, when executing a computer subprogram stored in the memory 301, may implement the following operations: feeding back the parameter-configuring state obtained after the parameter configuring to a user side.

In some embodiments, the processor 302, when executing a computer subprogram stored in the memory 301, may implement the following operations: according to the parameter taking-effect state, determining a corresponding taking-effect condition; and according to the taking-effect condition, performing the taking-effect processing; and the taking-effect condition includes one or more of taking effect immediately, taking effect when a BMC restarts automatically, taking effect when a BMC restarts next time, and taking effect delayed.

Figure 4:
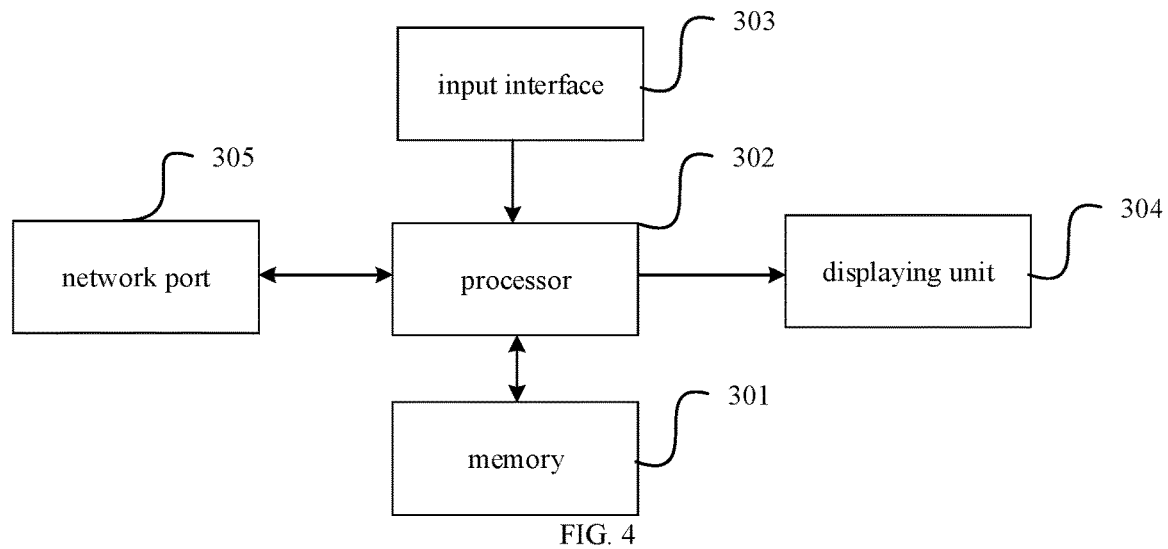
FIG. 4 is a structural diagram of another electronic device according to an embodiment of the present application.

On the basis of the above embodiments, as an embodiment, referring to FIG. 4, FIG. 4 is a structural diagram of another electronic device according to an embodiment of the present application. The electronic device further includes:

an input interface 303, connected to the processor 302, configured for acquiring computer programs, parameters and instructions imported externally, and, under the controlling by the processor 302, saving into the memory 301. The input interface 303 may be connected to an inputting device, and receive parameters or instructions inputted manually by the user. The inputting device may be a touch layer covering the display screen, may also be a key, a trackball or a touch-controlling board provided at the housing of a terminal, and may also be a keyboard, a touch-controlling board, a mouse and so on.

A displaying unit 304, connected to the processor 302, configured for displaying the data sent by the processor 302.

The displaying unit 304 may be a display screen, a liquid-crystal display screen or an electronic-ink display screen in a PC (Personal Computer).

A network port 305, connected to the processor 302, configured for making communicative connection with external terminal devices. The communication technique employed by the communicative connection may be a wired-communication technique or a wireless-communication technique, such as Mobile High-Definition Link, Universal Serial Bus, High-Definition Multimedia Interface, Wireless Fidelity, Bluetooth communication, low-power-consumption Bluetooth communication, and communication based on IEEE802.11s.

Because the embodiments of the electronic device and the embodiments of the method correspond to each other, the embodiments of the electronic device may refer to the description on the embodiments of the method, and are not discussed further herein.

A computer-readable storage medium according to the embodiments of the present application will be described below, and the computer-readable storage medium described below and the method described above may correspondingly refer to each other.

The present embodiment provides a computer-readable storage medium, and the computer-readable storage medium stores a computer program, and the computer program, when executed by a processor, implements the operations of the method for BMC-parameter configuring and taking-effect stated above.

Because the embodiments of the computer-readable storage medium and the embodiments of the method correspond to each other, the embodiments of the computer-readable storage medium may refer to the description on the embodiments of the method, and are not discussed further herein.

The embodiments of the description are described in the mode of progression, each of the embodiments emphatically describes the differences from the other embodiments, and the same or similar parts of the embodiments may refer to each other. Regarding the devices according to the embodiments, because they correspond to the methods according to the embodiments, they are described simply, and the relevant parts may refer to the description on the methods.

A person skilled in the art may further understand that the units and the algorithm steps of the examples described with reference to the embodiments disclosed herein may be implemented by using electronic hardware, computer software or a combination thereof. In order to clearly explain the interchangeability between the hardware and the software, the above description has described generally the configurations and the steps of the examples according to the functions. Whether those functions are executed by hardware or software depends on the particular applications and the design constraints of the technical solutions. A person skilled in the art may employ different methods to implement the described functions with respect to each of the particular applications, but the implementations should not be considered as extending beyond the scope of the present application.

The steps of the method or algorithm described with reference to the embodiments disclosed herein may be implemented directly by using hardware, a software module executed by a processor or a combination thereof. The software module may be embedded in a Random Access Memory, an internal memory, a read-only memory, an electrically programmable read-only memory, an electrically erasable programmable read-only memory, a register, a hard disk, a removable disk, or a storage medium in any other form well known in the art.

The method and apparatus for BMC-parameter configuring and taking-effect, the electronic device and the computer-readable storage medium according to the present application have been described in detail above. The principle and the embodiments of the present application are described herein with reference to the particular examples, and the description of the above embodiments is merely intended to facilitate to comprehend the method according to the present application and its core concept. It should be noted that a person skilled in the art may make improvements and modifications on the present application without departing from the principle of the present application, and all of the improvements and modifications fall within the protection scope of the claims of the present application.

The invention claimed is:

1. A method for BMC-parameter configuring and taking-effect, wherein the method comprises:
   after a first process receives a first external parameter, modifying a parameter-configuring state corresponding to the first external parameter of a database to be being-configured, writing the first external parameter into the database, and triggering an interruption serving program at the same time;
   by using the interruption serving program, determining whether in the database there exists a parameter-configuring state that is the being-configured;
   when in the database there exists the parameter-configuring state that is the being-configured, writing the first external parameter stored in the database into a configuration file; and
   after the first external parameter is successfully written into the configuration file, acquiring, from the database, a parameter taking-effect state corresponding to the first external parameter, and according to the parameter taking-effect state, performing taking-effect processing.

2. The method for BMC-parameter configuring and taking-effect according to claim 1, wherein the database stores parameter-configuring states corresponding to a plurality of types of parameters;
   the database is provided with parameter taking-effect states, to represent conditions required for taking-effect of each of the types of parameters; and
   processes, by using the corresponding parameter-configuring states and parameter taking-effect states in the database, solve problems of communication between different processes.

3. The method for BMC-parameter configuring and taking-effect according to claim 1, wherein the operation of, after the first process receives the first external parameter, writing the first external parameter into the database, and triggering the interruption serving program at the same time comprises:
   after the first process receives the first external parameter by using a first GPIO, writing the first external parameter into the database, and triggering the interruption serving program by using a second GPIO short-circuited to the first GPIO at the same time.

4. The method for BMC-parameter configuring and taking-effect according to claim 1, wherein the method further comprises:
   after a second process receives a second external parameter, determining whether in the database there exists a parameter-configuring state that is the being-configured; and when no parameter-configuring state is the being-configured, modifying a parameter-configuring state corresponding to the second external parameter of the database to be the being-configured, to realize configuring and taking-effect of the second external parameter.

5. The method for BMC-parameter configuring and taking-effect according to claim 1, wherein the method further comprises:
recording a configuring duration of the configuring of the first external parameter; and
when the configuring duration exceeds a preset duration, determining that the configuring is overtime.

6. The method for BMC-parameter configuring and taking-effect according to claim 1, wherein after the operation of writing the first external parameter into the database, the method further comprises:
after the first external parameter is successfully written into the configuration file, updating the parameter-configuring state corresponding to the first external parameter in the database to configuration success; and
when the first external parameter is not successfully written into the configuration file, according to an error type of a writing error in a writing process, updating the parameter-configuring state, wherein the parameter-configuring state corresponding to the error type includes one or more of being-idle, configuration file does not exist, configuration parameter does not exist, parameter configuration error and another error.

7. The method for BMC-parameter configuring and taking-effect according to claim 1, wherein the method further comprises:
feeding back the parameter-configuring state obtained after the parameter configuring to a user side.

8. The method for BMC-parameter configuring and taking-effect according to claim 1, wherein the database is a redis database.

9. The method for BMC-parameter configuring and taking-effect according to claim 1, wherein the operation of, according to the parameter taking-effect state, performing the taking-effect processing comprises:
according to the parameter taking-effect state, determining a corresponding taking-effect condition; and
according to the taking-effect condition, performing the taking-effect processing;
wherein the taking-effect condition includes one or more of taking effect immediately, taking effect when a BMC restarts automatically, taking effect when a BMC restarts next time, and taking effect delayed.

10. An electronic device, wherein the electronic device comprises:
a memory configured for storing a computer program; and
a processor configured for, when executing the computer program, implementing the operations comprising:
after a first process receives a first external parameter, modifying a parameter-configuring state corresponding to the first external parameter of a database to be being-configured, writing the first external parameter into the database, and triggering an interruption serving program at the same time;
by using the interruption serving program, determining whether in the database there exists a parameter-configuring state that is the being-configured;
when in the database there exists the parameter-configuring state that is the being-configured, writing the first external parameter stored in the database into a configuration file; and
after the first external parameter is successfully written into the configuration file, acquiring, from the database, a parameter taking-effect state corresponding to the first external parameter, and according to the parameter taking-effect state, performing taking-effect processing.

11. A computer-readable storage medium, wherein the computer-readable storage medium stores a computer program, and the computer program, when executed by a processor, implements the operations comprising:
after a first process receives a first external parameter, modifying a parameter-configuring state corresponding to the first external parameter of a database to be being-configured, writing the first external parameter into the database, and triggering an interruption serving program at the same time;
by using the interruption serving program, determining whether in the database there exists a parameter-configuring state that is the being-configured;
when in the database there exists the parameter-configuring state that is the being-configured, writing the first external parameter stored in the database into a configuration file; and
after the first external parameter is successfully written into the configuration file, acquiring, from the database, a parameter taking-effect state corresponding to the first external parameter, and according to the parameter taking-effect state, performing taking-effect processing.

12. The method for BMC-parameter configuring and taking-effect according to claim 1, wherein the operation of writing the first external parameter into the database comprises:
writing the first external parameter into a predetermined position of the database.

13. The method for BMC-parameter configuring and taking-effect according to claim 1, wherein the method further comprises:
providing a key-value pair of one parameter-configuring state in the database, wherein a state key describes a key-value pair of a type of an array, and each of elements in the array represents the parameter-configuring state of a type of parameters.

14. The method for BMC-parameter configuring and taking-effect according to claim 1, wherein the method further comprises:
providing a key-value pair of one parameter taking-effect state in the database, wherein a state key describes a key-value pair of a type of an array, and each of elements in the array represents a taking-effect condition of a type of parameters.

15. The method for BMC-parameter configuring and taking-effect according to claim 5, wherein after the operation of when the configuring duration exceeds a preset duration, determining that the configuring is overtime, the method further comprises:
processing configuring of the next external parameter; and
after a predetermined condition is reached, reconfiguring the first external parameter.

16. The electronic device according to claim 10, wherein the database stores parameter-configuring states corresponding to a plurality of types of parameters;
the database is provided with parameter taking-effect states, to represent conditions required for taking-effect of each of the types of parameters; and
processes, by using the corresponding parameter-configuring states and parameter taking-effect states in the database, solve problems of communication between different processes.

17. The electronic device according to claim 10, wherein the operation of, after the first process receives the first external parameter, writing the first external parameter into the database, and triggering the interruption serving program at the same time comprises:

after the first process receives the first external parameter by using a first GPIO, writing the first external parameter into the database, and triggering the interruption serving program by using a second GPIO short-circuited to the first GPIO at the same time.

18. The electronic device according to claim 10, wherein the operations further comprise:

after a second process receives a second external parameter, determining whether in the database there exists a parameter-configuring state that is the being-configured; and when no parameter-configuring state is the being-configured, modifying a parameter-configuring state corresponding to the second external parameter of the database to be the being-configured, to realize configuring and taking-effect of the second external parameter.

19. The computer-readable storage medium according to claim 11, wherein the database stores parameter-configuring states corresponding to a plurality of types of parameters;

the database is provided with parameter taking-effect states, to represent conditions required for taking-effect of each of the types of parameters; and processes, by using the corresponding parameter-configuring states and parameter taking-effect states in the database, solve problems of communication between different processes.

20. The computer-readable storage medium according to claim 11, wherein the operation of, after the first process receives the first external parameter, writing the first external parameter into the database, and triggering the interruption serving program at the same time comprises:

after the first process receives the first external parameter by using a first GPIO, writing the first external parameter into the database, and triggering the interruption serving program by using a second GPIO short-circuited to the first GPIO at the same time.

* * * * *